United States Patent

Wu et al.

(10) Patent No.: US 9,160,162 B2
(45) Date of Patent: Oct. 13, 2015

(54) PROTECTION CIRCUIT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kang Wu, Shenzhen (CN); Bo Tian, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 11 days.

(21) Appl. No.: 14/230,211

(22) Filed: Mar. 31, 2014

(65) Prior Publication Data

US 2014/0340795 A1    Nov. 20, 2014

(30) Foreign Application Priority Data

May 14, 2013    (CN) .......................... 2013 1 01769327

(51) Int. Cl.
*H02H 5/04*     (2006.01)
*H02H 7/08*     (2006.01)
*H02H 3/24*     (2006.01)

(52) U.S. Cl.
CPC ...................................... *H02H 3/243* (2013.01)

(58) Field of Classification Search
CPC ............................. G05F 11/07; H02L 29/7815
USPC ....................................................... 361/23, 30
See application file for complete search history.

(56) References Cited

U.S. PATENT DOCUMENTS

| | | | |
|---|---|---|---|
| 5,608,595 A * | 3/1997 | Gourab et al. | 361/79 |
| 5,638,246 A * | 6/1997 | Sakamoto et al. | 361/103 |
| 2005/0286194 A1* | 12/2005 | Fujiki et al. | 361/100 |
| 2012/0268851 A1* | 10/2012 | Nishio et al. | 361/58 |
| 2015/0109706 A1* | 4/2015 | Iwamizu | 361/84 |

* cited by examiner

*Primary Examiner* — Erick Glass
(74) *Attorney, Agent, or Firm* — Novak Druce Connolly Bove + Quigg LLP

(57) ABSTRACT

A protection circuit includes a protection module and a fan electrically connected to the protection module. The protection module includes a control chip, an inverter, and an electronic switch. An input terminal of the inverter is electrically connected to a voltage output terminal and the fan, and further electrically connected to a clear pin of the control chip. An output terminal of the inverter is electrically connected to a preparation pin of the control chip. A first terminal of the electronic switch is electrically connected to an output pin of the control chip. The first and second terminals of the electronic switch are electrically connected to a power source terminal. A third terminal of the electronic switch is electrically connected to the voltage output terminal. When the fan short-circuits, the power source terminal stops supplying power to the fan through the voltage output terminal.

6 Claims, 1 Drawing Sheet

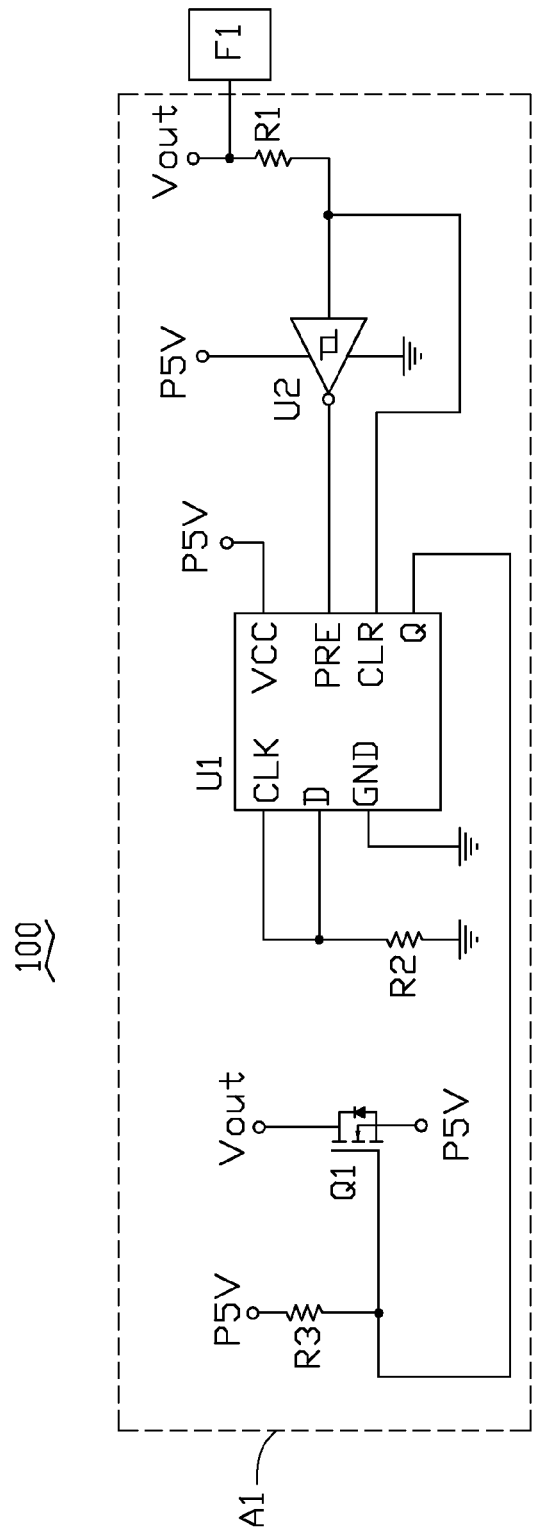

PROTECTION CIRCUIT

FIELD

The present disclosure relates to a protection circuit.

BACKGROUND

Fans are usually applied in electronic devices, such as servers, to dissipate heat produced in operation of the electronic devices. During operating of the electronic device, if a fan in the electronic device is short circuits, a motherboard of the electronic device could be damaged, thus affecting operation of other electronic components on the motherboard.

Therefore, there is need for improvement in the art.

BRIEF DESCRIPTION OF THE DRAWING

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

The FIGURE is a circuit diagram of an embodiment of a protection circuit electrically connected to a fan.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The phrase "a plurality of" means "at least two."

The FIGURE shows an embodiment of a protection circuit 100 for controlling a plurality of fans to dissipate heat from a server. In this embodiment, the protection circuit 100 includes a protection module A1 and a fan F1 electrically connected to the protection module A1. In another embodiment, the protection circuit 100 can include multiple protection modules and a same number of fans, such that each protection module is electrically connected to a corresponding fan. A construction of each protection module is the same as the construction of the protection module A1 of the FIGURE.

The protection module A1 includes a control chip U1, an inverter U2, a voltage output terminal Vout, and an electronic switch Q1. An input terminal of the inverter U2 is electrically connected to the voltage output terminal Vout and the fan F1 through a resistor R1. A power terminal VCC of the inverter U2 and a power pin VCC of the control chip U1 are electrically connected to a power supply terminal P5V. A ground pin of the inverter U2 is grounded. A preparation pin PRE of the control chip U1 is electrically connected to an output terminal of the inverter U2. A clear pin CLR of the control chip U1 is electrically connected to the input terminal of the inverter U2. A clock pin CLK of the control chip U1 is electrically connected to a data pin D of the control chip U1, and is grounded through a resistor R2. A ground pin GND of the control chip U1 is grounded. In the embodiment, the control chip U1 is a data flip-flop.

A first terminal of the electronic switch Q1 is electrically connected to an output pin Q of the control chip U1. The first terminal of the electronic switch Q1 is electrically connected to the power supply terminal P5V through a resistor R3. A second terminal of the electronic switch Q1 is electrically connected to the power supply terminal P5V. A third terminal of the electronic switch Q1 is electrically connected to the voltage output terminal Vout.

In the embodiment, the electronic switch Q1 is an n-channel metal-oxide semiconductor field-effect transistor (NMOSFET). The first through third terminals of the electronic switch Q1 correspond to a gate, a source, and a drain of the NMOSFET, respectively. In another embodiment, the electronic switch Q1 can be an npn bipolar junction transistor (BJT), such that the first through third terminals of the electronic switch Q1 correspond to a base, an emitter, and a collector of the npn BJT, respectively.

In use, when the fan F1 connected to the protection module A1 short-circuits, the input terminal of the inverter U2 of the protection module A1 receives a digital-low signal, such as logic 0. Meanwhile, the output terminal of the inverter U2 outputs a digital-high signal, such as logic 1, to the preparation pin PRE of the control chip U1. When the preparation pin PRE receives the digital-high signal, the output pin Q of the control chip U1 outputs a digital-low signal, such as logic 0, to the first gate of the electronic switch Q1, thereby turning off the electronic switch Q1. Thus, the power supply terminal P5V stops supplying power to the fan F1 through the voltage output terminal Vout. Therefore, other electronic components on the motherboard are protected from being damaged when the fan F1 short-circuits.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A protection circuit comprising at least one protection module, the at least one protection module electrically connected to a corresponding fan, the protection module comprising:

a control chip comprising a power pin electrically connected to a power source terminal, a clock pin and a data pin grounded;

a voltage output terminal;

an inverter comprising a power terminal electrically connected to the power source terminal, an input terminal, and an output terminal, wherein the input terminal is electrically connected to the voltage output terminal through a first resistor, the voltage output terminal is electrically connected to the fan, and the input terminal of the inverter is electrically connected to a clear pin of the control chip; the output terminal of the inverter is electrically connected to a preparation pin of the control chip; and an electronic switch comprising first through third terminals, wherein the first terminal of the electronic switch is electrically connected to an output pin of the control chip; the first and second terminals of the electronic switch are electrically connected to the power source terminal; the third terminal of the electronic switch is electrically connected to the voltage output terminal;

wherein when the fan short circuits, the input terminal of the inverter of the protection module electrically connected to the fan receives a digital-low signal; the output terminal of the inverter outputs a digital-high signal to the preparation pin of the control chip; the output pin of the control chip outputs a digital-low signal, the electronic switch is turned off, and the power source terminal stops supplying power to the fan through the voltage output terminal.

2. The protection circuit of claim 1, wherein the first terminal of the electronic switch is electrically connected to the power source terminal through a second resistor.

3. The protection circuit of claim 2, wherein the clock pin and the data pin of the control chip are grounded through a third resistor.

4. The protection circuit of claim 3, wherein the control chip is a data flip-flop.

5. The protection circuit of claim 2, wherein the electronic switch is an n-channel metal-oxide semiconductor field-effect transistor (MOSFET), and the first through third terminals of the electronic switch correspond to a gate, a source, and a drain of the MOSFET, respectively.

6. The protection circuit of claim 2, wherein the electronic switch is an npn bipolar junction transistor (BJT), and the first through third terminals of the electronic switch correspond to a base, an emitter, and a collector of the npn BJT, respectively.

* * * * *